Nov. 16, 1965 W. BARNSCHEIDT ETAL 3,217,426
STEAM HEATED DRYING CYLINDER
Filed Sept. 8, 1960
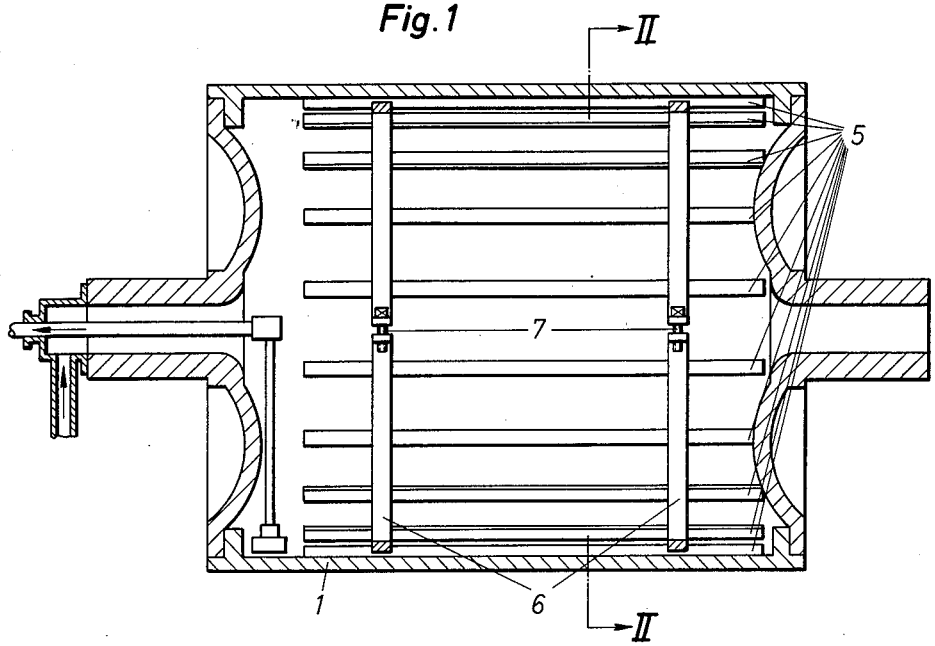
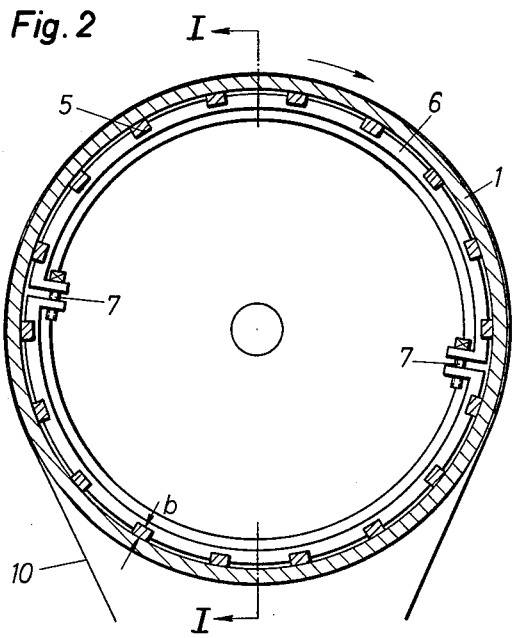
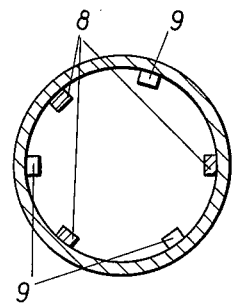
INVENTORS
HANS W. BARNSCHEIDT
ADOLF STAUD
BY Toulmin & Toulmin
ATTORNEYS

United States Patent Office 3,217,426
Patented Nov. 16, 1965

3,217,426
STEAM HEATED DRYING CYLINDER
Wolfgang Barnscheidt, Dusseldorf, and Adolf Staud, Heidenheim (Brenz), Germany, assignors to J. M. Voith G.m.b.H., Maschinenfabrik, Heidenheim (Brenz), Germany
Filed Sept. 8, 1960, Ser. No. 54,785
Claims priority, application Germany, Sept. 12, 1959, V 17,237
2 Claims. (Cl. 34—110)

The present invention relates to hollow, steam heated drying cylinders to be used in fast running paper machines.

Such drying cylinders are used to dry wet paper webs guided along a portion of their surfaces. It has been observed that the surface temperature of the cylinder during drying operation is lower than the saturation temperature of the steam inside thereof. Consequently, water will continuously condense at the inner surface of the cylinder. It has further been observed that in fast running i.e. rotating cylinders the condensated water will cover the entire inner surface of the cylinder due to the centrifugal force urging the water towards the wall thereof, and therefore the water will rotate with the cylinder. The thickness of this water layer will be more uniform throughout the cylinder if the cylinder has a higher speed of rotation.

The condensation of the water produces a considerable amount of heat which travels through the wall of the cylinder. It will be appreciated that the process of condensation occurs at that surface of the water layer which is remote from the inner surface of the cylinder wall. Consequently, all heat has also to travel through the layer of condensed water.

In addition, it is important, that this water layer along the inner surface of the cylinder has a density stratification with the coolest portion and therefore most dense water adjacent the inner surface of the drying cylinder while the warmest water is most remote therefrom.

Taking all these conditions together it will be appreciated that the heat produced by the condensating steam has to travel first through this water layer which extends throughout the inner surface of the cylinder and the heat then has to travel through the wall of the cylinder itself.

It is known that the heat conductivity of water is relatively low. Therefore, this water layer provides an effective resistance for the heat transfer through the inner part of the cylinder towards its outer surface. Consequently, the surface temperature of the layer of condensated water remains relatively high and the efficiency of the heating process of the steam is greatly reduced. Of course, with increasing thickness of the water layer the efficiency of the heating process is further reduced.

To obtain reasonable effective drying it is therefore necessary to continuously extract water from the drying cylinder.

It is known in the art to use stationary or running siphons. Various modifications of this type are known. However, it has been found that these siphons do not completely drain the cylinder. To extract water by means of siphons condensated water must continuously flow through the cylinder towards the siphons. This flow of water must have a height not smaller than a predetermined minimum. If one uses, for example, a cylinder with a diameter of 1500 mm., this water height was found to be at least 1 mm. A reduction of this height and an increase of the drainage, and therefore a further intended improvement of the heat transfer from the steam to the cylinder wall cannot be obtained by means of siphons. Consequently, at the present time there seems to be a limit as to possible improvements of the heat transfer from the steam through the cylinder.

It has been suggested to provide scooping tubes or bars along the inner wall of a slowly running cylinder to continuously scoop the condensed water collected at the lower portion therein. On one end of the cylinder a collecting device may be provided into which the conically shaped scooping tubes will pour the condensed water. From the collecting device the water then leaves the cylinder outwardly. This device still is not suitable for completely removing the condensed water, and there still remains a film of condensed water at the inner surface of this cylinder having a thickness of about 1 mm.

It is an object of the present invention to provide a new and improved hollow drying cylinder which is steam heated and used in fast running machines, particularly paper machines. The invention is based on the proposition that there always will remain a water layer along the inner surface of this cylinder, and the particular object of the invention is to improve the conduction or transfer of heat from the steam through the cylinder wall in spite of this water layer.

According to one aspect of the invention in a preferred embodiment thereof it is suggested to provide separable rails along the inner surface of a hollow, steam heated drying cylinder which rails are to extend perpendicular to the circumferential direction of the cylinder, and furthermore means are provided to urge these rails towards the inner surface of the cylinder. The rails are to have at least a thickness of about the average thickness of the condensed water layer as it is extending throughout the inner surface of the drying cylinder during operation.

While the specification concludes with claims particularly pointing out and distinctly claiming the subject matter which is regarded as the invention, it is believed that the object of the invention and further objects and advantages thereof will be bettter understood from the following description taken in connection with the accompanying drawing in which:

FIGURE 1 is a longitudinal cross-sectional view through a cylinder taken along line 1—1 of FIGURE 2, illustrating the preferred embodiment of the invention, showing in connection therewith a conventional syphon type condensate removal means.

FIG. 2 is a cross-section through a cylinder taken along line II—II of FIGURE 1 illustrating an embodiment of the present invention; and FIG. 3 is a cross-sectional view through a cylinder illustrating a second embodiment of the invention.

Turning now to the detailed description of the drawing, particularly to FIG. 1 and FIG. 2 thereof, reference numeral 1 denotes a hollow drying cylinder for a paper machine over which is running a wet web 10 to be dried. The cylinder 1 rotates relatively fast, having a circumferential speed of above 1500 feet/min. up to about 2300 feet/min. or more since the operation of the device according to the invention is not impaired by increasing speed. The driving mechanism for the cylinder 1 is not shown and it is understood that this driving mechanism is a conventional one and does not constitute a part of the present invention.

The hollow inner portion of cylinder 1 is filled with or passed through by hot water vapor, i.e. steam for the purpose of heating the cylinder 1. The purpose of this heating is, of course, to dry the wet paper 10 when passing over cylinder 1.

As already stated above, the temperature of the cylinder wall is always below the saturation temperature of the steam inside of the cylinder. Accordingly, water will condense along the inner wall of this cylinder 1. A conventional siphon will extract the condensated water from the cylinder. The centrifugal forces press the water against the cylinder wall, but the gravitation continues to act upon this water.

Suppose the cylinder rotates in the direction of the arrow indicated on top of cylinder 1 in FIG. 2, then the left hand portion of the cylinder is raising while the right hand portion is falling. Accordingly, the condensed water will be decelerated on the left hand side of the cylinder by gravitation and it will be accelerated on the right hand side of the cylinder, accordingly. Thus, a relative motion of the condensed water with respect to the cylinder is produced.

In the embodiment of the invention illustrated in FIGURE 2, the inner wall of the cylinder 1 is provided with a plurality of flat rails 5. These rails extend substantially all the way through the cylinder in the direction perpendicular to the plane of the drawings. These rails are also not an integral part of the cylinder 1. A two part expansion ring 6 is biased by turn buckles 7 and urges the rails 5 against the inner wall of cylinder 1. It will be appreciated that in longitudinal or axial direction of the cylinder, extending perpendicularly to the plane of the drawing, several of these expansion rings are provided to properly support and position the rails 5.

The rails according to the invention exert a disturbing effect upon any of the motions of the ring shaped layer of condensed water.

These disturbing rails act in such a manner that water moving relatively to the wall in a direction perpendicular to the extension of the rails will be dammed up on one side thereof and will flow from this rail on the other side thereof. The damming of the water produces a wave which detaches itself from the rails and moves in circumferential direction until it reaches another rail. The wave will now be reflected on the latter rail. Basically, it is possible to use only one rail, and in this case the wave would be reflected from that side of the rail from which the water is flowing away at that particular instant. However, it will be appreciated that a symmetrical arrangement such as shown in FIGS. 1 and 2 is to be preferred for reasons of a balanced cylinder drive.

During one revolution of the cylinder, each of the two sides of each rail produces one wave. The two waves produced by one rail have a phase difference of half a period of the cylinder rotation. Furthermore, the wave produced by the two sides of one rail propagate in opposite directions.

Due to the friction between the water and the wall of the cylinder the wave is slowed down in the layers of water adjacent the cylinder, while the same wave at the surface of the water can propagate almost unretarded. Accordingly, each wave soon rolls over and heavy turbulence is produced thereby. Due to this turbulence and the occurrence of strong eddies and vortices the heat transfer through the water layer into the cylinder is considerably improved.

According to tests made with a drying cylinder according to the invention it has been found that the surface temperature of this cylinder, particularly the temperature at the outer surface thereof is extremely uniform in any direction. This is a very important improvement for modern, fast running paper machines because an ununiform drying of the paper, particularly in one direction thereof, is avoided, and consequently tearing of the web or other disturbances of operation are avoided.

The device according to the invention has the further advantage that the surface temperature of a cylinder having these rails is uniformly increased by several degrees without changing the operating data of the heating steam as compared with a cylinder without these rails; thus the drying effect of a single cylinder is increased. This advantage is of great practical importance because it permits the reduction of the number of drying cylinders in a paper machine as compared with known machines.

The distance between adjacent rails is selected so that the oscillation produced in the cylindrically shaped water ring around the inner surface of cylinder 1 extends from one rail to the next one. The height of the rails in radial direction indicated by the character reference $b$ is determined by the average thickness of the water layer inside of the cylinder which, of course, is in turn determined by the operating conditions, particularly the temperature of the heating steam and the inner overall diameter of cylinder 1. By a simple test the desired thickness will be detected. It will be appreciated that this thickness of the water layer is produced by the dynamic equilibrium of condensation and removal of condensated water.

In a cylinder which has been manufactured with a diameter of 1500 millimeters a height for the rails of $b=6$ to 8 mm. was found to be the best dimensioning thereof, while altogether eighteen rails were used. The steam temperature was 364° F., and a pressure of 17 p.s.i.g. was maintained therein. The number of rails used is not particularly critical, and even one or two rails of this height improve considerably the heat transfer from the steam inside of the cylinder into the wall thereof.

FIG. 3 illustrates another embodiment of the invention. In this cross-section one can see that the rails are divided into two groups, one designated with a character reference 8, the other group being denoted with character reference 9. The cross-section shown in FIG. 3 is taken near one end of a drying cylinder. Thus, one will observe that the rails of group 9 do not extend all the way to this end of the cylinder. However, the rails 9 will, in fact extend all the way toward the other end of the cylinder, while the rails of group 8 will not extend all the way through to this last mentioned end of the cylinder. Thus, the rails are positioned in an alternating and staggered relationship. Each group of rails is clamped separately against the inner surface of the cylinder by means of axially spaced clamping rings such as 6 as shown in FIG. 2. Thus, these rails run with the cylinder and do not change their mutual distance. The rings have been omitted from FIG. 3 for sake of clarity.

It will further be observed that the distance between adjacent rails in this embodiment is not a uniform one. The purpose of this arrangement is to avoid the production of resonating water oscillations inside of the cylinder.

The invention is not limited to the embodiments described above but all changes and modifications thereof not constituting departure from the spirit and scope of the invention are intended to be covered by the following claims.

We claim:

1. In a rotating steam heated drying cylinder of a high speed paper making machine, comprising a hollow cylindrical shell where the inside surface of the shell during operation becomes covered with a thin layer of condensate from the heating steam and where the cylinder is provided with a device for continual removal of the condensate, the combination comprising, at least two removable rails seated snugly upon the inner cylindrical surface of the cylinder approximately parallel to the axis of the cylinder, and means pressing said rails against said surface, said pressing means including plural rings disposed at either end and adjacent the rails, the rings provided with turnbuckles spreading the ring to secure the rails against the inside of the drum, the rails extending radially inwardly from the inner cylindrical surface in such a manner that the condensate layer is interrupted by the rails and prevented from rotating uniformly about the axis of the cylinder while the portions of the condensate layer that are between the rails are being continually agitated.

2. The invention as defined in claim 1, wherein the peripheral distance between some adjacent rails is greater than the peripheral distance between other adjacent rails.

References Cited by the Examiner
UNITED STATES PATENTS

| | | | |
|---|---|---|---|
| 1,483,343 | 2/1924 | Gladin | 34—125 |
| 1,640,019 | 8/1927 | Young | 34—124 |
| 2,817,908 | 12/1957 | Hornbostel | 34—110 |

FOREIGN PATENTS

| | | |
|---|---|---|
| 189,725 | 12/1922 | Great Britain. |
| 195,808 | 4/1923 | Great Britain. |
| 80,767 | 11/1919 | Switzerland. |

NORMAN YUDKOFF, *Primary Examiner.*

CHARLES O'CONNELL, *Examiner.*